US006329056B1

(12) United States Patent
Deve et al.

(10) Patent No.: US 6,329,056 B1
(45) Date of Patent: Dec. 11, 2001

(54) METAL MATRIX COMPOSITE WIRES, CABLES, AND METHOD

(75) Inventors: Herve E. Deve, Minneapolis; Michael W. Carpenter, St. Paul; Colin McCullough, Minneapolis; Paul S. Werner, Woodbury, all of MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/616,593

(22) Filed: Jul. 14, 2000

(51) Int. Cl.[7] .......................... B32B 15/00; B22D 19/00; H01B 11/02

(52) U.S. Cl. .......................... 428/389; 428/368; 428/378; 428/375; 428/379; 428/500; 428/514; 428/614; 174/113 R; 174/119 R; 164/91; 164/97; 164/100; 164/105; 164/501

(58) Field of Search .................................... 428/367, 368, 428/375, 378, 379, 389, 514, 500, 614; 174/113 R, 119 R; 164/47, 91, 97, 100, 105, 801

(56) References Cited

U.S. PATENT DOCUMENTS

| | | | | |
|---|---|---|---|---|
| 4,649,060 | | 3/1987 | Ishikawa et al. | 427/57 |
| 4,779,563 | | 10/1988 | Ishikawa et al. | 118/612 |
| 4,877,643 | | 10/1989 | Ishikawa et al. | 427/57 |
| 4,961,990 | | 10/1990 | Yamada et al. | 428/240 |
| 4,980,242 | * | 12/1990 | Yamamoto et al. | 428/614 |
| 5,171,942 | | 12/1992 | Powers | 174/129 R |
| 5,554,826 | | 9/1996 | Gentry | 174/128.1 |
| 5,736,199 | | 4/1998 | Blucher | 427/430 |
| 6,180,232 | * | 1/2001 | McCullough et al. | 428/379 |
| 6,245,425 | * | 6/2001 | McCullough et al. | 428/379 |

FOREIGN PATENT DOCUMENTS

| | | |
|---|---|---|
| 0 162 542 B1 | 7/1992 | (EP) . |
| S54-89907 | 7/1979 | (JP) . |
| 6-158197 | 6/1994 | (JP) . |
| WO 92/14860 | 9/1992 | (WO) . |
| WO 97/00976 | 1/1997 | (WO) . |

OTHER PUBLICATIONS

Y. Yasutomi, et al., "Effects of the SiC/Al interface reaction on fracture beharior of a composite conductor using SiC fiber reinforced aluminum for next generation power equipment", *Journal of Materials Science* 34 (1999) pp. 1583–1593.

Chenge Zhang and Lingsen Wang, "SiC Fiber/Aluminum Preform Wires Fabricated By Ultrasonic Liquid Infiltration Process", Central South Univ. of Technology, Changsha (China) 1995, pp. 1–5.

Akio Ozawa et al., "Mechanical Characteristics of SiC Fiber Reinforced Aluminum Composite Material", 1995 The Electricity Society National Symposium.

Akio Ozawa et al., "Mechanical Characteristics of SiC fiber reinforced Composite Wire", 1996 The Electricity Society National Symposium.

Akio Ozawa et al., "Development and Evaluation Characteristics of SiC Fiber Reinforced Aluminum Composite Wires for Transmission Line", 1995 The Electricity Society Electronics and Energy Department Symposium.

(List continued on next page.)

*Primary Examiner*—Cynthia H. Kelly
*Assistant Examiner*—J. M. Gray
(74) *Attorney, Agent, or Firm*—Arthur J. Brady

(57) ABSTRACT

Metal matrix composite wires that include a plurality of substantially continuous, longitudinally positioned fibers in a metal matrix. The wire exhibits zero breaks over a length of at least 300 meters when tested according to a specified test.

31 Claims, 7 Drawing Sheets

OTHER PUBLICATIONS

H. Gigerenzer et al., "Hot–Drawing of Fiber (Filament) Reinforced Metal–Matrix Composites", Proceedings of the 1978 International Conference on Composite Materials, ICCM/2, Apr. 16–20, 1978.

David M. Goddard et al., "Continuous Graphite Fiber MMCs", *Engineered Materials Handbook*, vol. 1, Composites, 1987.

Howard A. Katzman, "Fiber Coatings for Composite Fabrication", *Materials & Manufacturing Processes*, 5(1), 1–15 (1990).

H.M. Cheng et al., "Preparation of Carbon Fibre Reinforced Aluminium Via Ultrasonic Liquid Infiltration Technique", *Materials Science and Technology*, Jul. 1993, vol. 9, pp. 609–614.

H. Gigerenzer et al., "Drawing of Graphite of Graphite Fiber Reinforced Aluminum Composites", Failure Modes in Composites IV, Proceedings of a symposium sponsored by the TMS–AIME/ASM Joint Composite Materials Committee, Oct. 24–26, 1977, pp. 359–369.

Joseph T. Blucher et al., "A New Pressure Infiltration Process for Continuous Production of Fiber Reinforced MMC Structural Elements", $30^{th}$ International Sample Technical Conference, Oct. 20–24, 1998.

Y. Tsunekawa et al., "Application of Ultrasonic Vibration to Molten Aluminum Infiltration", *Key Engineering Materials* vols. 104–107 (1995) pp. 215–224.

J.H. Nader et al., "Correlation of Thermal Models with Microstructural Effects in Continuous MMC Wire Production", *Materials Science and Engineering* A266 (1999) 52–61.

M.G. Williams et al., "Analytically Motivated Process Improvements in Continuous Metal–Matrix Composite Wire Fabrication", *Materials Science and Engineering* A266 (1999) 86–92.

Hong Wan, Jin Pan, Deming Yang, "In–Situ Aluminum Matrix Composite Prepared by Ultrasonic Vibration", Proceedings of ICCM–10, Whistler, B.C. Canada, Aug. 1995, pp. 161–167.

L. Pennander and C–H Andersson, "Vibration Exitated Low Pressure Casting, A New Route to Produce Preform Based Metal Matrix Composite Materials", Proceedings of the $12^{th}$ Risø International Symposium on Materials Science, Sep. 2–6, 1991.

J. Pan, C. Li, D.M. Yang and X.F. Yin, "A Study About the Mechanism of Ultrasonic Liquid Infiltration for $SiC_f$/Al Composites", Proceedings of the Ninth International Conference on Composite Materials (ICCM/9), Madrid, Jul. 12–16, 1993.

L–O Pennander et al., "Vibration Excitated Low–Pressure Casting, A New Route to Produce Metal Matrix Composites", Mar. 1, 1991, ICCM/VIII, Section 12–21.

T. Yamauchi and Y. Nishida, "Infiltration Kinetics of Fibrous Preforms by Aluminum with Solidification", (Title unreadable) vol. 43(?), pp. 1313–1321, 1995 [Best copy available].

Robert G. Shaver, "Metal Matrix Compositing by Continuous Casting", Proceedings of the Sixth St. Louis Symposium, May 11–12, 1972.

H. Nakanishi et al., "Ultrasound–assisted pressureless infiltration of molten aluminium into alumina capillaries", *Journal of Materials Science Letters* 12 (1993) pp. 1313–1315.

J. Pan, D.M. Yang and X.F. Yin, "A Study of the ultrasonic technique applied in fabrication of SiC fiber–reinforced aluminum composites", *J. Mater. Res.*, vol. 10, No. 3, Mar. 1995, pp. 596–601.

Yang Deming, Yin Xinfang, Pan Jin, "Continuous yarn fibre–reinforced aluminum composites prepared by the ultrasonic liquid infiltration method", *Journal of Materials Science Letters* 12 (1993) pp. 252–253.

A.J. Cook and P.S. Werner, "Pressure Infiltration Casting of Metal Matrix Composites", *Materials Science and Engineering*, A144 (1991) pp. 189–206.

* cited by examiner

METAL MATRIX COMPOSITE WIRES, CABLES, AND METHOD

FIELD OF THE INVENTION

The present invention pertains to composite wires reinforced with substantially continuous fibers within a metal matrix and cables incorporating such wires.

BACKGROUND OF THE INVENTION

Metal matrix composite's (MMC's) have long been recognized as promising materials due to their combination of high strength and stiffness combined with low weight. MMC's typically include a metal matrix reinforced with fibers. Examples of metal matrix composites include aluminum matrix composite wires (e.g., silicon carbide, carbon, boron, or polycrystalline alpha alumina fibers in an aluminum matrix), titanium matrix composite tapes (e.g., silicon carbide fibers in a titanium matrix), and copper matrix composite tapes (e.g., silicon carbide fibers in a copper matrix).

The use of some metal matrix composite wires as a reinforcing member in bare overhead electrical power transmission cables is of particular interest. The need for new materials in such cables is driven by the need to increase the power transfer capacity of existing transmission infrastructure due to load growth and changes in power flow due to deregulation. Basic performance requirements for such new materials include corrosion resistance, environmental endurance (e.g., UV and moisture), resistance to loss of strength at elevated temperatures, and creep resistance.

Important properties for performance are elastic modulus, density, coefficient of thermal expansion, electrical conductivity, and strength. These properties are typically governed by the choice and purity of constituents (i.e., the metal matrix material and the fiber) in combination with the fiber volume fraction. Of these properties, emphasis has been placed on the development of wires made from fibers with high tensile strength and stiffness.

The presence of imperfections in the wire such as intermetallic phases, porosity as a result, for example, of shrinkage or internal gas (e.g., hydrogen or water vapor) voids, and particularly dry (i.e., uncoated) fiber, are known to decrease properties such as strength the of the wire. These imperfections can result from impurities in constituents (i.e., material of the metal matrix and the fiber), incompatibility of constituents, as well as incomplete infiltration of the matrix material into the fibers.

There is a need for substantially continuous metal matrix composite wire with consistently good mechanical properties.

SUMMARY OF THE INVENTION

The present invention relates to substantially continuous fiber metal matrix composites. Embodiments of the present invention pertain to metal matrix composites (e.g., composite wires) having a plurality of substantially continuous, longitudinally positioned fibers contained within a metal matrix. Metal matrix composites according to the present invention are formed into wires exhibiting desirable properties with respect to elastic modulus, density, coefficient of thermal expansion, electrical conductivity, and strength.

The present invention provides a metal matrix composite wire that includes at least one tow (typically a plurality of tows) comprising a plurality of substantially continuous, longitudinally positioned fibers in a metal matrix. The fibers are selected from the group of ceramic fibers, carbon fibers, and mixtures thereof. The melting point of the metal matrix material is not greater than 1100° C. (typically, not greater than 1000° C., and may not be greater than 900° C., 800° C., or even 700° C.). Significantly, the wire has a length of at least 300 meters (preferably, in order of preference, at least about 400 meters, at least about 500 meters, at least about 600 meters, at least about 700 meters, at least about 800 meters, at least about 900 meters, and at least about 1000 meters) and a bend failure value of zero. By this it is meant that the wire exhibits zero breaks over a length of at least 300 meters (preferably, in order of preference, at least about 400 meters, at least about 500 meters, at least about 600 meters, at least about 700 meters, at least about 800 meters, at least about 900 meters, and at least about 1000 meters) when tested according to the "Wire Proof Test" described in the Examples.

In another embodiment there is provided a method of making the composite wires according to the present invention. This method includes providing a contained volume of molten metal matrix material; imparting ultrasonic energy to cause vibration of at least a portion of the contained volume of molten metal matrix material; immersing at least one tow (typically a plurality of tows) comprising a plurality of substantially continuous fibers into the contained volume of melted matrix material, wherein the fibers are selected from the group of ceramic fibers, carbon fibers, and mixtures thereof; imparting ultrasonic energy to cause vibration of at least a portion of the contained volume of molten metal matrix material to permit at least a portion of the molten metal matrix material to infiltrate into the plurality of fibers such that an infiltrated plurality of fibers is provided; and withdrawing the infiltrated plurality of fibers from the contained volume of molten metal matrix material under conditions which permit the molten metal matrix material to solidify to provide a metal matrix composite wire according to the present invention.

In yet another embodiment, there is provided a cable that includes at least one metal matrix composite wire according to the present invention.

DEFINITIONS

As used herein, the following terms are defined as:

"Substantially continuous fiber" means a fiber having a length that is relatively infinite when compared to the average fiber diameter. Typically, this means that the fiber has an aspect ratio (i.e., ratio of the length of the fiber to the average diameter of the fiber) of at least about $1\times10^5$, preferably, at least about $1\times10^6$, and more preferably, at least about $1\times10^7$. Typically, such fibers have a length on the order of at least about 50 meters, and may even have lengths on the order of kilometers or more.

"Longitudinally positioned" means that the fibers are oriented in the same direction as the length of the wire.

DETAILED DESCRIPTION OF PREFERRED EMBODIMENTS

The present invention provides relatively long lengths of metal matrix composite wire with significantly improved mechanical properties, as exhibited, for example, by at least 300 meter lengths of metal matrix composite wire according to the present invention having a bend failure value of zero. Although not wanting to be bound by theory, it is believed that such improved properties are obtained as a result of reducing or eliminating local imperfections (e.g., local dry fiber, local porosity as a result of shrinkage or internal gas voids, microporosity, and/or local intermetallics, in the wire during fabrication thereof).

Figure 1:
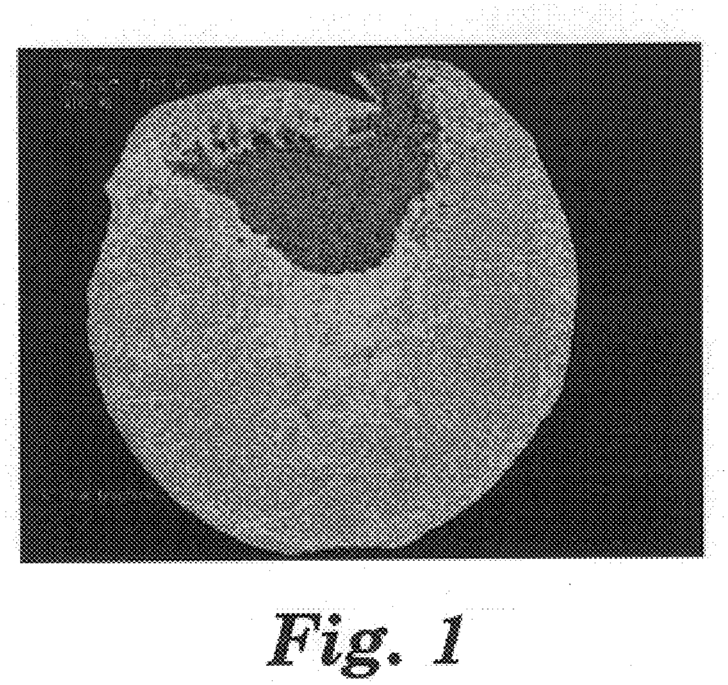
FIG. 1 is a photomicrograph of a cross-section of a metal matrix composite wire showing a local region in which only the fibers are present, devoid of matrix.
Figure 2:
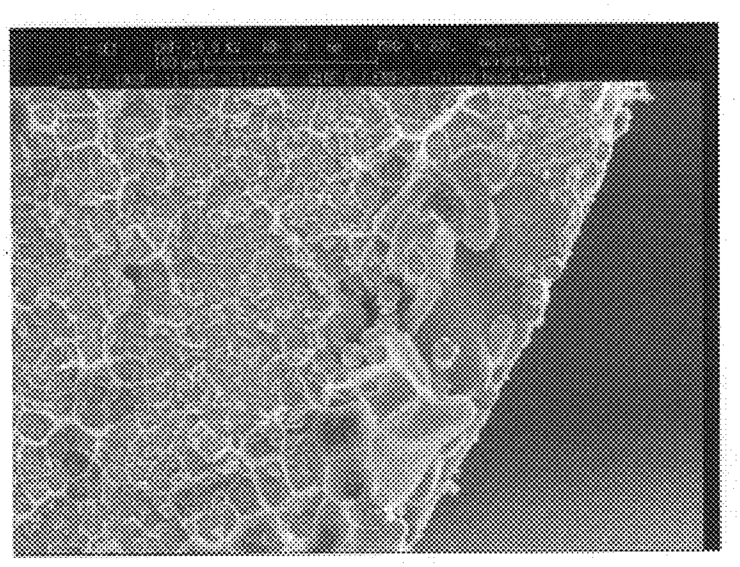
FIG. 2 is a scanning electron micrograph of a cross-section of a metal matrix composite wire showing shrinkage porosity.
Figure 3:
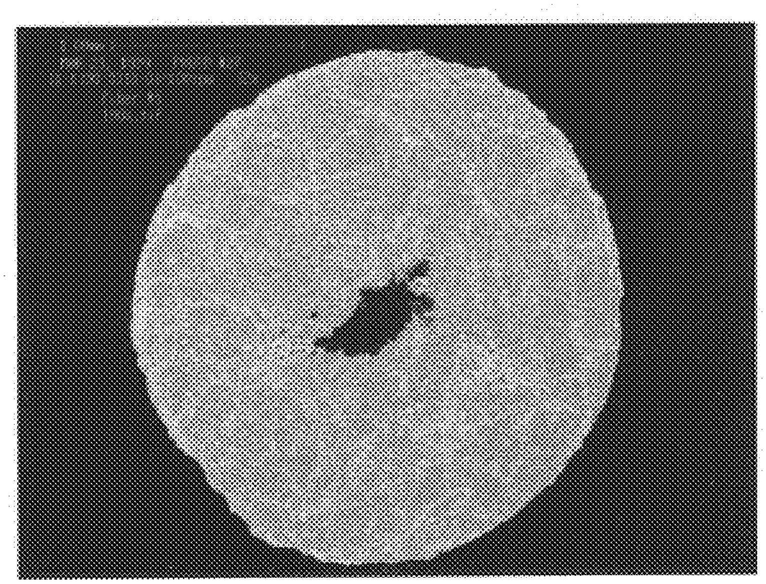
FIG. 3 is a scanning electron micrograph of a cross-section of a metal matrix composite wire showing voids created due to the presence of trapped gas (e.g., hydrogen or water vapor).
Figure 4:
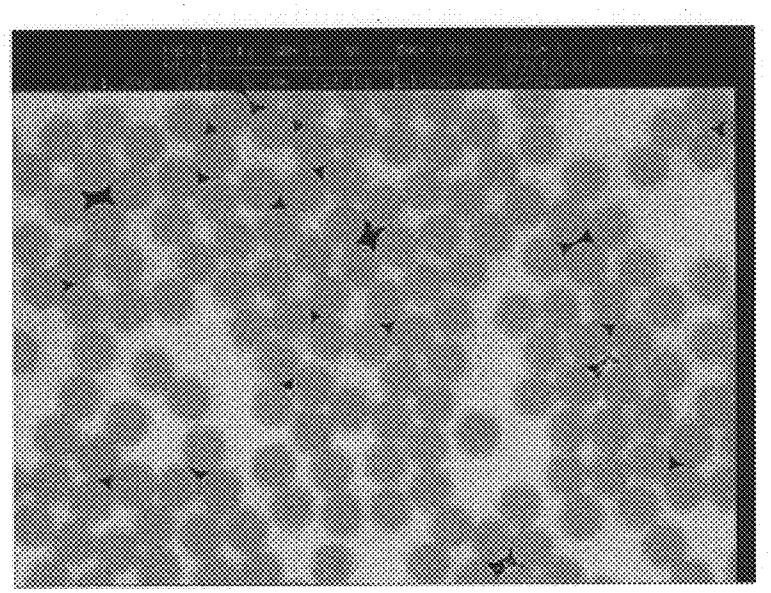
FIG. 4 is a scanning electron micrograph of a cross-section of a metal matrix composite wire showing microporosity.

Although it is known that the presence of imperfections in the wire such as intermetallic phases, dry fiber, porosity as a result, for example, of shrinkage or internal gas (e.g., hydrogen or water vapor) voids, etc. are known to decrease properties such as the strength of the wire, while not wanting to be bound by theory, Applicants have discovered and believe that the presence imperfections in known metal matrix composite wires is more prevalent along lengths of wire than is known in the art. For example, testing or analyzing a meter of wire for properties and other characteristics, does not necessarily mean that a 10 meters, 50 meter, 100 meter, etc. length of the wire will consistently exhibit the desired degree of properties or characteristics. Such imperfections in the wire may include local intermetallic phases, local dry (i.e., uncoated) fiber (see, e.g., FIG. 1), porosity as a result of shrinkage (see, e.g., FIG. 2) or internal gas voids (sce, e.g., FIG. 3), and microporosity (see, c.g., FIG. 4). It is believed that such imperfections can dramatically decrease properties such as the strength of the metal matrix composite wire. Although not wanting to be bound by theory, preferred wires made by Applicants inventive method are believed to have significantly reduced (or to have eliminated) one or more of such imperfections along its length, as compared to the art, thereby providing wire with significantly improved properties exhibited, for example, by the wire having a bend failure value of zero over lengths of at least 300 meters.

The present invention provides wires and cables that include fiber reinforced metal matrix composites. A composite wire according to the present invention includes at least one tow comprising a plurality of substantially continuous, longitudinally positioned, reinforcing fibers such as ceramic (C.g., $Al_2O_3$-based) reinforcing fibers encapsulated within a matrix that includes one or more metals (e.g., highly pure elemental aluminum or alloys of pure aluminum with other elements, such as copper). Preferably, at least about 85% by number of the fibers are substantially continuous in a wire according to the present invention. At least one wire according to the present invention can be combined into a cable, preferably, an electric power transmission cable.

The substantially continuous reinforcing fibers preferably have an average fiber diameter of at least about 5 micrometers. Typically, the average fiber diameter is no greater than about 50 micrometers, more typically, no greater than about 25 micrometers.

Preferably, the fibers have a modulus of no greater than about 1000 GPa, and more preferably, no greater than about 420 GPa. Preferably, fibers have a modulus of greater than about 70 GPa.

Examples of substantially continuous fibers that may be useful for making metal matrix composite materials according to the present invention include ceramic fibers, such as metal oxide (e.g., alumina) fibers and silicon carbide fibers, and carbon fibers. Typically, the ceramic oxide fibers are crystalline ceramics and/or a mixture of crystalline ceramic and glass (i.e., a fiber may contain both crystalline ceramic and glass phases).

Preferably, the ceramic fibers have an average tensile strength of at least about 1.4 GPa, more preferably, at least about 1.7 GPa, even more preferably, at least about 2.1 GPa, and most preferably, at least about 2.8 GPa. Preferably, the carbon fibers have an average tensile strength of at least about 1.4 GPa, more preferably, at least about 2.1 GPa; even more preferably, at least about 3.5 GPa; and most preferably, at least about 5.5 GPa.

Tows are well known in the fiber art and refer to a plurality of (individual) fibers (typically at least 100 fibers, more typically at least 400 fibers) collected in a rope-like form. Tows preferably comprise at least 780 individual fibers per tow, and more preferably at least 2600 individual fibers per tow. Tows of ceramic fibers are available in a variety of lengths, including 300 meters and longer. The fibers may have a cross-sectional shape that is circular or elliptical.

Methods for making alumina fibers are known in the art and include the method disclosed in U.S. Pat. No. 4,954,462 (Wood et al.), the disclosure of which is incorporated herein by reference.

Preferably, the alumina fibers are polycrystalline alpha alumina-based fibers and comprise, on a theoretical oxide basis, greater than about 99 percent by weight $Al_2O_3$ and about 0.2–0.5 percent by weight $SiO_2$, based on the total weight of the alumina fibers. In another aspect, preferred polycrystalline, alpha alumina-based fibers comprise alpha alumina having an average grain size of less than 1 micrometer (more preferably, less than 0.5 micrometer). In another aspect, preferred polycrystalline, alpha alumina-based fibers have an average tensile strength of at least 1.6 GPa (preferably, at least 2.1 GPa, more preferably, at least 2.8 GPa). Preferred alpha alumina fibers are commercially available under the trade designation "NEXTEL 610" from the 3M Company of St. Paul, Minn.

Suitable aluminosilicate fibers are described in U.S. Pat. No. 4,047,965 (Karst et al.), the disclosure of which is incorporated herein by reference. Preferably, the aluminosilicate fibers comprise, on a theoretical oxide basis, in the range from about 67 to about 85 percent by weight $Al_2O_3$ and in the range from about 33 to about 15 percent by weight $SiO_2$, based on the total weight of the aluminosilicate fibers. Some preferred aluminosilicate fibers comprise, on a theoretical oxide basis, in the range from about 67 to about 77 percent by weight $Al_2O_3$ and in the range from about 33 to about 23 percent by weight $SiO_2$, based on the total weight of the aluminosilicate fibers. One preferred aluminosilicate fiber comprises, on a theoretical oxide basis, about 85 percent by weight $Al_2O_3$ and about 15 percent by weight $SiO_2$, based on the total weight of the aluminosilicate fibers. Another preferred aluminosilicate fiber comprises, on a theoretical oxide basis, about 73 percent by weight $Al_2O_3$ and about 27 percent by weight $SiO_2$, based on the total weight of the aluminosilicate fibers. Preferred aluminosilicate fibers are commercially available under the trade designations "NEXTEL 440" ceramic oxide fibers, "NEXTEL 550" ceramic oxide fibers, and "NEXTEL 720" ceramic oxide fibers from the 3M Company.

Suitable aluminoborosilicate fibers are described in U.S. Pat. No. 3,795,524 (Sowman), the disclosure of which is incorporated herein by reference. Preferably, the aluminoborosilicate fibers comprise, on a theoretical oxide basis: about 35 percent by weight to about 75 percent by weight (more preferably, about 55 percent by weight to about 75 percent by weight) $Al_2O_3$; greater than 0 percent by weight (more preferably, at least about 15 percent by weight) and less than about 50 percent by weight (more preferably, less than about 45 percent, and most preferably, less than about 44 percent) $SiO_2$; and greater than about 5 percent by weight (more preferably, less than about 25 percent by weight, even more preferably, about 1 percent by weight to about 5 percent by weight, and most preferably, about 10 percent by weight to about 20 percent by weight) $B_2O_3$, based on the total weight of the aluminoborosilicate fibers. Preferred aluminoborosilicate fibers are commercially available under the trade designation "NEXTEL 312" from the 3M Company. Suitable silicon carbide fibers are commercially available, for example, from COI Ceramics of San Diego, Calif. under the trade designation "NICALON" in tows of 500 fibers, from Ube Industries of Japan, under the trade designation "TYRANNO", and from Dow Corning of Midland, Mich. under the trade designation "SYLRAMIC".

Suitable carbon fibers are commercially available, for example, from Amoco Chemicals of Alpharetta, Ga. under the trade designation "THORNEL CARBON" in tows of 2000, 4000, 5,000, and 12,000 fibers, Hexcel Corporation of Stamford, Conn., from Grafil, Inc. of Sacramento, Calif. (subsidiary of Mitsubishi Rayon Co.) under the trade designation "PYROFIL", Toray of Tokyo, Japan, under the trade designation "TORAYCA", Toho Rayon of Japan, Ltd. under the trade designation "BESFIGHT", Zoltek Corporation of St. Louis, Mo. under the trade designations "PANEX" and "PYRON", and Inco Special Products of Wyckoff, N.J. (nickel coated carbon fibers), under the trade designations "12K20" and "12K50".

Commercially available fibers typically include an organic sizing material added to the fiber during their manufacture to provide lubricity and to protect the fiber strands during handling. It is believed that the sizing tends to reduce the breakage of fibers, reduces static electricity, and reduces the amount of dust during, for example, conversion to a fabric. The sizing can be removed, for example, by dissolving or burning it away. Preferably, the sizing is removed before forming the metal matrix composite wire according to the present invention. In this way, before forming the aluminum matrix composite wire the ceramic oxide fibers are free of any sizing thereon.

It is also within the scope of the present invention to have coatings on the fibers. Coatings may be used, for example, to enhance the wettability of the fibers, to reduce or prevent reaction between the fibers and molten metal matrix material. Such coatings and techniques for providing such coatings are known in the fiber and metal matrix composite art.

Wires according to the present invention preferably comprise at least 15 percent by volume (more preferably, in increasing preference, at least 20, 25, 30, 35, 40, or 50 percent by volume) of the fibers, based on the total volume of the fibers and matrix material. Typically, metal matrix composite wires according to the present invention comprise in the range from about 30 to about 70 (preferably, about 40 to about 60) percent by volume of the fibers, based on the total volume of the fibers and matrix material.

Wires according to the present invention have a length, in order of preference, of at least 300 meters, at least about 400 meters, at least about 500 meters, at least about 600 meters, at least about 700 meters, at least about 800 meters, and at least about 900 meters, over which they demonstrate zero breaks (i.e., a bend failure value of zero) according to the Wire Proof Test described herein.

The average diameter of the wire according to the present invention is preferably at least about 0.5 millimeter (mm), more preferably, at least about 1 mm, and more preferably at least about 1.5 mm. In another aspect, wires according to the present invention preferably have an average tensile strength of at least about 350 MPa.

The matrix material may be selected such that the matrix material does not significantly react chemically with the fiber material (i.e., is relatively chemically inert with respect to fiber material), for example, to eliminate the need to provide a protective coating on the fiber exterior. Preferred metal matrix materials include aluminum, zinc, tin, and alloys thereof (e.g., an alloy of aluminum and copper). More preferably, the matrix material includes aluminum and alloys thereof. The reported melting points of aluminum, zinc, tin are 660° C., 420° C., and 232° C., respectively. For aluminum matrix materials, preferably, the matrix comprises at least 98 percent by weight aluminum, more preferably, at least 99 percent by weight aluminum, even more preferably, greater than 99.9 percent by weight aluminum, and most preferably, greater than 99.95 percent by weight aluminum. Preferred aluminum alloys of aluminum and copper comprise at least about 98 percent by weight Al and up to about 2 percent by weight Cu. Although higher purity metals tend to be preferred for making higher tensile strength wires, less pure forms of metals are also useful.

Suitable metals are commercially available. For example, aluminum is available under the trade designation "SUPER PURE ALUMINUM; 99.99% Al" from Alcoa of Pittsburgh, Pa. Aluminum alloys (e.g., Al-2% by weight Cu (0.03% by weight impurities) can be obtained from Belmont Metals, New York, N.Y. Zinc and tin are available, for example, from Metal Services, St. Paul, Minn. ("pure zinc"; 99.999% purity and "pure tin"; 99.95% purity). Examples of tin alloys include 92wt.% Sn-8wt.% Al (which can be made, for example, by adding the aluminum to a bath of molten tin at 550° C. and permitting the mixture to stand for 12 hours prior to use). Examples of tin alloys include 90.4wt. % Zn-9.6wt. % Al (which can be made, for example, by adding the aluminum to a bath of molten zinc at 550° C. and permitting the mixture to stand for 12 hours prior to use).

The particular fibers, matrix material, and process steps for making metal matrix composite wire according to the present invention are selected to provide metal matrix composite wire with the desired properties. For example, the fibers and metal matrix materials are selected to be sufficiently compatible with each other and the wire fabrication process in order to make the desired wire. Additional details regarding some preferred techniques for making aluminum and aluminum alloy matrix composites are disclosed, for example, in copending application having U.S. Ser. No. 08/492,960, now issued as U.S. Pat. No. 6,245,425, and PCT application having publication No. WO 97/00976, published May 21, 1996, the disclosures of which are incorporated herein by reference.

Figure 5:
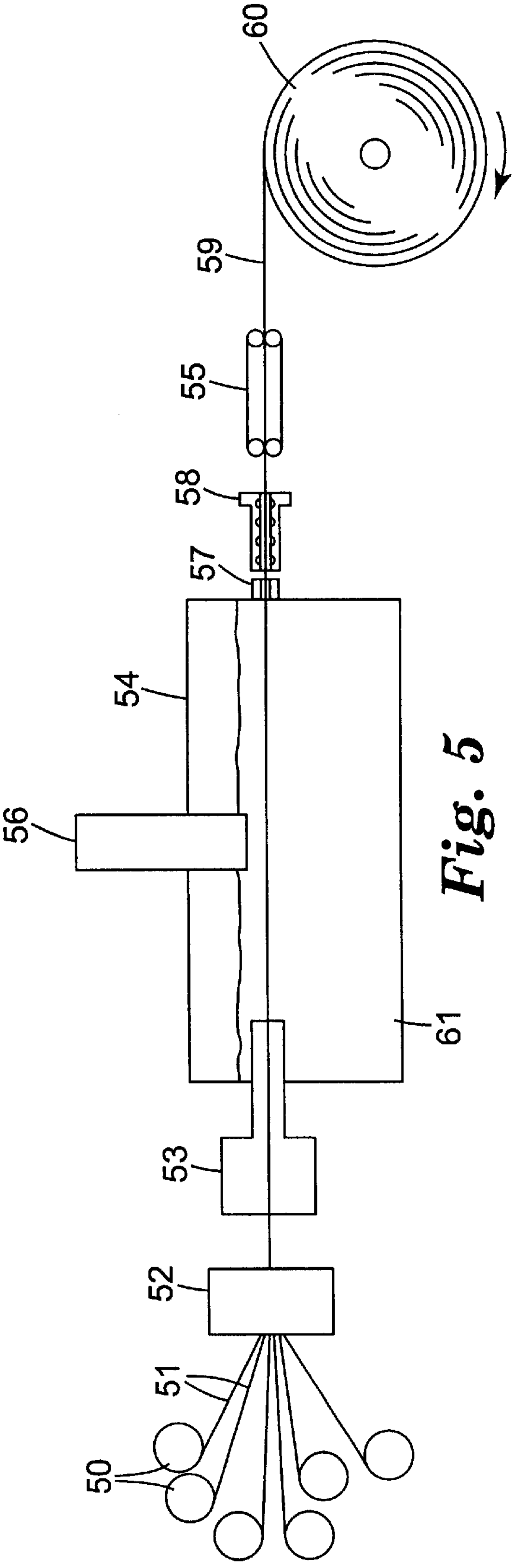
FIG. 5 is a schematic of the ultrasonic apparatus used to infiltrate fibers with molten metals.

Continuous metal matrix composite wire according to the present invention can be made, for example, by continuous metal matrix infiltration processes. A schematic of a preferred apparatus for making wire according to the present invention is shown in FIG. 5. Tows of substantially continuous ceramic and/or carbon fibers 51 are supplied from supply spools 50, and are collimated into a circular bundle and heat-cleaned while passing through tube furnace 52. The fibers are then evacuated in vacuum chamber 53 before entering crucible 54 containing the melt of metallic matrix material 61 (also referred to herein as "molten metal"). The fibers are pulled from supply spools 50 by caterpuller 55. Ultrasonic probe 56 is positioned in the melt in the vicinity of the fiber to aid in infiltrating the melt into tows 51. The molten metal of the wire cools and solidifies after exiting crucible 54 through exit die 57, although some cooling may occur before it fully exits crucible 54. Cooling of wire 59 is enhanced by streams of gas or liquid 58. Wire 59 is collected onto spool 60. Optionally, the wire is tested in line using the Wire Proof Test described in the Examples, below.

Heat-cleaning the fiber aids in removing or reducing the amount of sizing, adsorbed water, and other fugitive or volatile materials that may be present on the surface of the fibers. Preferably, the fibers are heat-cleaned until the carbon content on the surface of the fiber is less than 22% area fraction. Typically, the temperature of the tube furnace is at least about 300° C., more typically, at least 1000° C. for at least several seconds at temperature, although the particular temperature(s) and time(s) will depend, for example, on the cleaning needs of the particular fiber being used.

Preferably, the fibers are evacuated before entering the melt, as it has been observed that the use of such evacuation tends to reduce or eliminate the formation of defects such as localized regions with dry fibers. Preferably, in increasing order of preference, the fibers are evacuated in a vacuum of not greater than 20 Torr, not greater than 10 Torr, not greater than 1 Torr, and not greater than 0.7 Torr.

An example of a suitable vacuum system is an entrance tube sized to match the diameter of the bundle of fiber. The entrance tube can be, for example, a stainless steel or alumina tube, and is typically at least 30 cm long. A suitable vacuum chamber typically has a diameter in the range from about 2 cm to about 20 cm, and a length in the range from about 5 cm to about 100 cm. The capacity of the vacuum pump is preferably at least 0.2–0.4 cubic meters/minute. The evacuated fibers are inserted into the melt through a tube on the vacuum system that penetrates the aluminum bath (i.e., the evacuated fibers are under vacuum when introduced into the melt), although the melt is typically at substantially atmospheric pressure. The inside diameter of the exit tube essentially matches the diameter of the fiber bundle. A portion of the exit tube is immersed in the molten aluminum. Preferably, about 0.5–5 cm of the tube is immersed in the molten metal. The tube is selected to be stable in the molten metal material. Examples of tubes which are typically suitable include silicon nitride and alumina tubes.

Infiltration of the molten metal into the fibers is typically enhanced by the use of ultrasonics. For example, a vibrating horn is positioned in the molten metal such that it is in close proximity to the fibers. Preferably, the fibers are within 2.5 mm of the horn tip, more preferably within 1.5 mm of the horn tip. The horn tip is preferably made of niobium, or alloys of niobium, such as 95 wt. % Nb-5 wt. % Mo and 91 wt. % Nb-9 wt. % Mo, and can be obtained, for example, from PMTI, Pittsburgh, Pa. For additional details regarding the use of ultrasonics for making metal matrix composites, see, for example, U.S. Pat. No. 4,649,060 (Ishikawa et al.), U.S. Pat. No. 4,779,563 (Ishikawa et al.), and 4,877,643 (Ishikawa et al.), application having U.S. Ser. No. 08/492,960, now issued as U.S. Pat. No. 6,245,425, and PCT application having publication No. WO 97/00976, published May 21, 1996, the disclosures of which are incorporated herein by reference.

The molten metal is preferably degassed (e.g., reducing the amount of gas (e.g., hydrogen) dissolved in the molten metal) during and/or prior to infiltration. Techniques for degassing molten metal are well known in the metal processing art. Degassing the melt tends to reduce gas porosity in the wire. For molten aluminum the hydrogen concentration of the melt is preferably, in order of preference, less than 0.2, 0.15, and 0.1 $cm^3$/100 grams of aluminum.

The exit die is configured to provide the desired wire diameter. Typically, it is desired to have a uniformly round wire along its length. The diameter of the exit die is usually slightly larger than the diameter of the wire. For example, the diameter of a silicon nitride exit die for an aluminum composite wire containing about 50 volume percent alumina fibers is about 3 percent smaller than the diameter of the wire. Preferably, the exit die is made of silicon nitride, although other materials may also be useful. Other materials that have been used as exit dies in the art include conventional alumina. It has been found by Applicants, however, that silicon nitride exit dies wear significantly less than conventional alumina dies, and hence are more useful in providing the desired diameter and shape of the wire, particularly over lengths of wire.

Typically, the wire is cooled after exiting the exit die by contacting the wire with a liquid (e.g., water) or gas (e.g., nitrogen, argon, or air). Such cooling aids in providing the desirable roundness and uniformity characteristics.

The diameter of the resulting wire is typically not a perfect circle. The ratio of the minimum and maximum diameter (i.e., for a given point on the length of the wire, the ratio of the shortest diameter to the largest diameter, wherein for a perfect it would be 1) typically is at least 0.9, preferably, in increasing order of desirability, at least 0.90, 0.91, 0.92, 0.93, 0.94, and 0.95. The cross-sectional shape of the wire may be, for example, circular, elliptical, square, rectangular, or triangular. Preferably, the cross-sectional shape of wire according to the present invention is circular, or nearly circular. Preferably, the average diameter of wire according to the present invention is at least 1 mm, more preferably, at least 1.5 mm, 2 mm, 2.5 mm, 3 mm, or 3.5 mm.

Metal matrix composite wires according to the present invention can be used in a variety of applications. They are particularly useful in overhead electrical power transmission cables.

Cables according to the present invention may be homogeneous (i.e., including only one type of metal matrix composite wire) or nonhomogeneous (i.e., including a plurality of secondary wires, such as metal wires). As an example of a nonhomogeneous cable, the core can include a plurality of wires according to the present invention with a shell that includes a plurality of secondary wires (e.g., aluminum wires).

Cables according to the present invention can be stranded. A stranded cable typically includes a central wire and a first layer of wires helically stranded around the central wire. Cable stranding is a process in which individual strands of wire are combined in a helical arrangement to produce a finished cable (see, e.g., U.S. Pat. No. 5,171,942 (Powers) and U.S. Pat. No. 5,554,826 (Gentry), the disclosures of which are incorporated herein by reference). The resulting helically stranded wire rope provides far greater flexibility than would be available from a solid rod of equivalent cross sectional area. The helical arrangement is also beneficial because the stranded cable maintains its overall round cross-sectional shape when the cable is subject to bending in handling, installation and use. Helically wound cables may include as few as 7 individual strands to more common constructions containing 50 or more strands.

Figure 8:
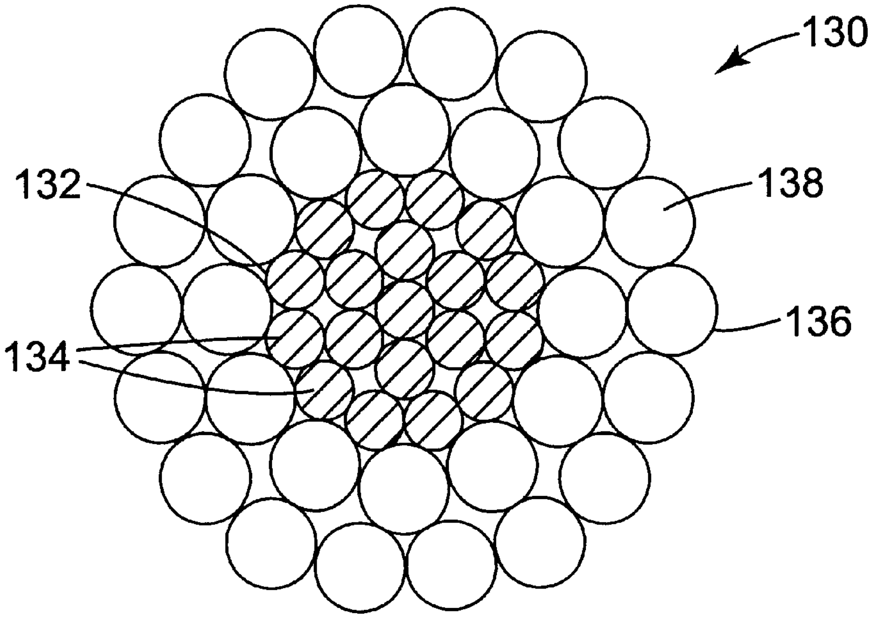
FIGS. 8 and 9 are schematic, cross-sections of two embodiments of overhead electrical power transmission cables having composite metal matrix cores.
Figure 9:
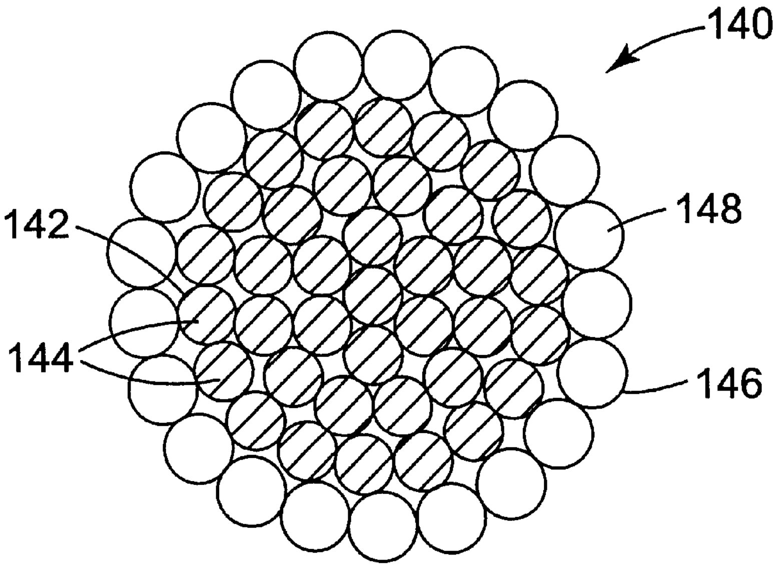

One exemplary electrical power transmission cable according to the present invention is shown in FIG. 8, where electrical power transmission cable according to the present invention 130 may be a core 132 of nineteen individual composite metal matrix wires 134 surrounded by a jacket 136 of thirty individual aluminum or aluminum alloy wires 138. Likewise, as shown in FIG. 9, as one of many alternatives, overhead electrical power transmission cable according to the present invention 140 may be a core 142 of thirty-seven individual composite metal matrix wires 144 surrounded by jacket 146 of twenty-one individual aluminum or aluminum alloy wires 148.

Figure 10:
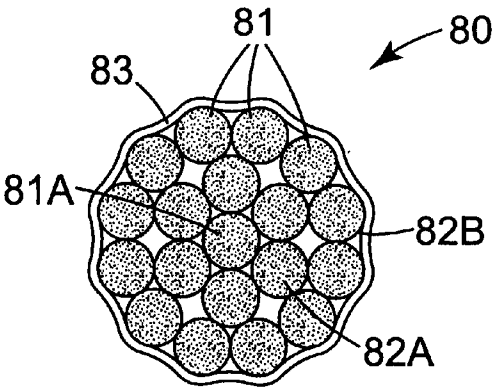
FIG. 10 is an end view of an embodiment of a stranded cable, prior to application of a maintaining means around the plurality of strands.

FIG. 10 illustrates yet another embodiment of the stranded cable 80. In this embodiment, the stranded cable includes a central metal matrix composite wire 81A and a first layer 82A of metal matrix composite wires that have been helically wound about the central metal matrix composite wire 81A. This embodiment further includes a second layer 82B of metal matrix composite wires 81 that have been helically stranded about the first layer 82A. Any suitable number of metal matrix composite wires 81 may be included in any layer. Furthermore, more than two layers may be included in the stranded cable 80 if desired.

Cables according to the present invention can be used as a bare cable or it can be used as the core of a larger diameter cable. Also, cables according to the present invention may be a stranded cable of a plurality of wires with a maintaining means around the plurality of wires. The maintaining means may be a tape overwrap, such as shown in FIG. 10 as 83, with or without adhesive, or a binder, for example.

Stranded cables according to the present invention are useful in numerous applications. Such stranded cables are believed to be particularly desirable for use in overhead electrical power transmission cables due to their combination of low weight, high strength, good electrical conductivity, low coefficient of thermal expansion, high use temperatures, and resistance to corrosion.

Figure 11:
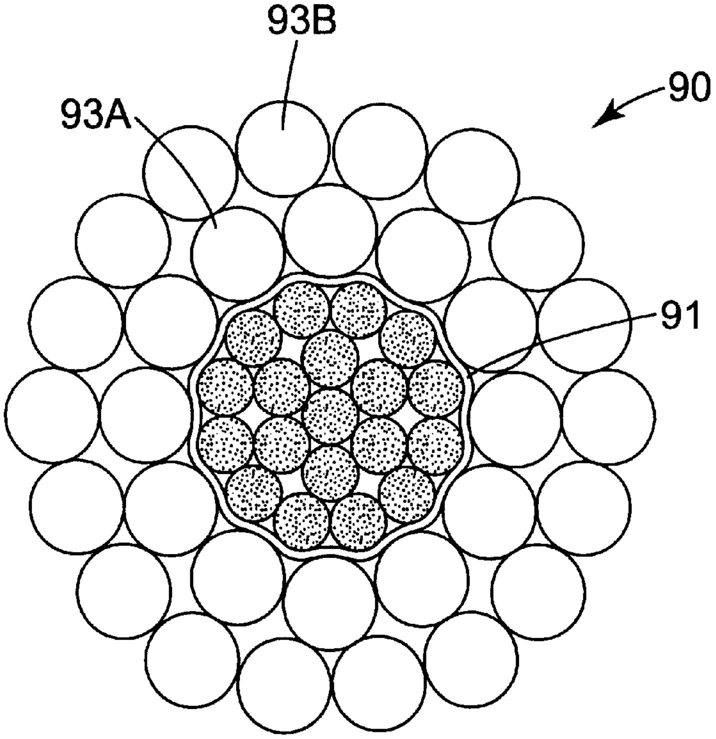
FIG. 11 is an end view of an embodiment of an electrical transmission cable.

An end view of one preferred embodiment of such a transmission cable 90 is illustrated in FIG. 11. Such a transmission cable includes a core 91 which can be any of the stranded cores described herein. The power transmission cable 90 also includes at least one conductor layer about the stranded core 91. As illustrated, the power transmission cable includes two conductor layers 93A and 93B. More conductor layers may be used as desired. Preferably, each conductor layer comprises a plurality of conductor wires as is known in the art. Suitable materials for the conductor wires includes aluminum and aluminum alloys. The conductor wires may be stranded about the stranded core 91 by suitable cable stranding equipment as is known in the art.

In other applications, in which the stranded cable is to be used as a final article itself, or in which it is to be used as an intermediary article or component in a different subsequent article, it is preferred that the stranded cable be free of electrical power conductor layers around the plurality of metal matrix composite wire 81.

Additional details regarding cables made from metal matrix composite wires are disclosed, for example, in application having U.S. Ser. No. 09/616,784, filed on the same date as the instant application, and application having U.S. Ser. No. 08/492,960, now issued as U.S. Pat. No. 6,245,425, and PCT application having publication No. WO 97/00976, published May 21, 1996, the disclosures of which are incorporated herein by reference. Additional details regarding making metal matrix composite materials and cables containing the same are disclosed, for example, in copending applications having U.S. Ser. Nos. 09/616,594, 09/616,589 and 09/616,741, all filed on the same date as the instant application, the disclosures of which are incorporated herein by reference.

EXAMPLES

This invention is further illustrated by the following examples, but the particular materials and amounts thereof recited in these examples, as well as other conditions and details, should not be construed to unduly limit this invention. Various modifications and alterations of the invention will become apparent to those skilled in the art. All parts and percentages are by weight unless otherwise indicated.

Test Procedures

Three-Point Bend Strength Test

Figure 12:
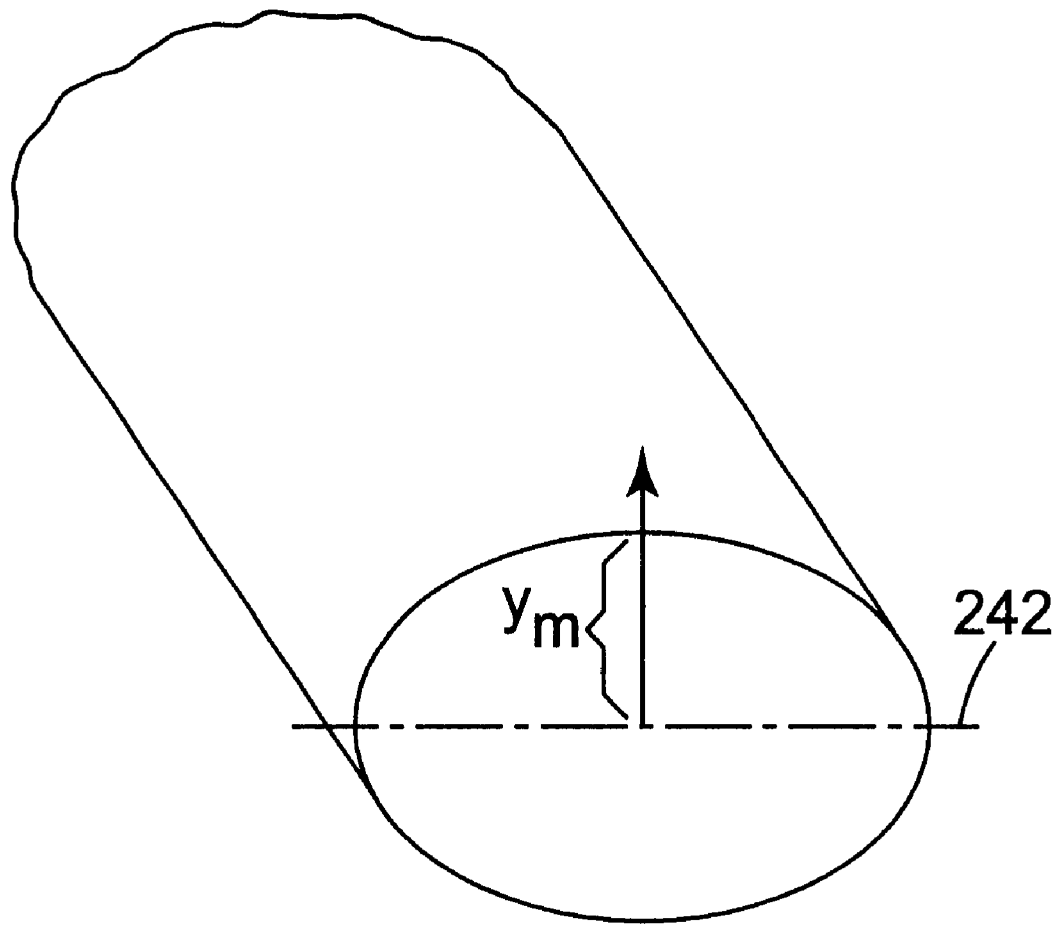
FIG. 12 is a cross-section of a test sample for the Three-Point Bend Strength Test.

The bend strength was measured using a three point bend method derived from ASTM standard E855-90, Test Method B, as published in the ASTM 1992 Annual Book of Standards, section 3, volume 03.01, published by ASTM, Philadelphia, Pa., the disclosure of which is incorporated herein by reference. The three-point bend strength is the nominal stress in the outer surface of the wire that results in the test sample breaking in two or more separate pieces. The test was carried out at room temperature (about 20° C.) on randomly selected samples using a universal test frame equipped with a three-point bend fixture and a device for continuously recording the load (both obtained from MTS, Eden Prairie, Minn.). The three-point bend strength, $\sigma_b$, of a sample, long in relation to its depth, tested in three point bending is given by Equation 1:

$$\sigma_b = \frac{y_m F l}{4I} \tag{1}$$

where F is the maximum load recorded by the load cell, l is the test span (i.e., the distance between two supports), $y_m$ is the perpendicular distance from the neutral axis to the surface of the test sample (see FIG. 12), and I is the second moment of area. Referring to FIG, 12, the second moment of area measures the resistance of the uniform section to bending about horizontal axis 242. The second moment of area is given by:

$$I = \int_{section} y^2 b(y) dy \quad (2)$$

where b(y) is the width of the section at y. Equations are well known for providing appropriate approximations for calculating second moment of area, I. The equations are selected to fit the cross-section of the sample. For example, for circular or nearly circular cross-sections, the second moment of area, I, is given by:

$$I = \frac{\pi d^4}{64} \quad (3)$$

where d is the diameter of the cross-section. For wires that are not perfectly circular, the Three-Point Bend Strength is measured by orienting the short axis of the wire vertically in the test apparatus. The diameter of the wire was measured using a micrometer (having precision of at least +/−2%). The wires from the examples were not perfectly circular (but were nearly circular). Therefore, both the minimum and maximum diameters (for the same points on the wire) were measured. The ratio of the minimum to maximum diameter of the wires from the examples were all greater than 0.9. For each test sample, the minimum diameter was measured every 5 cm along a 15 cm length, for a total of three diameter measurement readings. Since the cross-sections of the wires from the examples were nearly circular, Equation 3 (above) was used for the second moment of area, I. The diameter, d, used in the equation was the average of the three minimum diameter readings.

Figure 6:
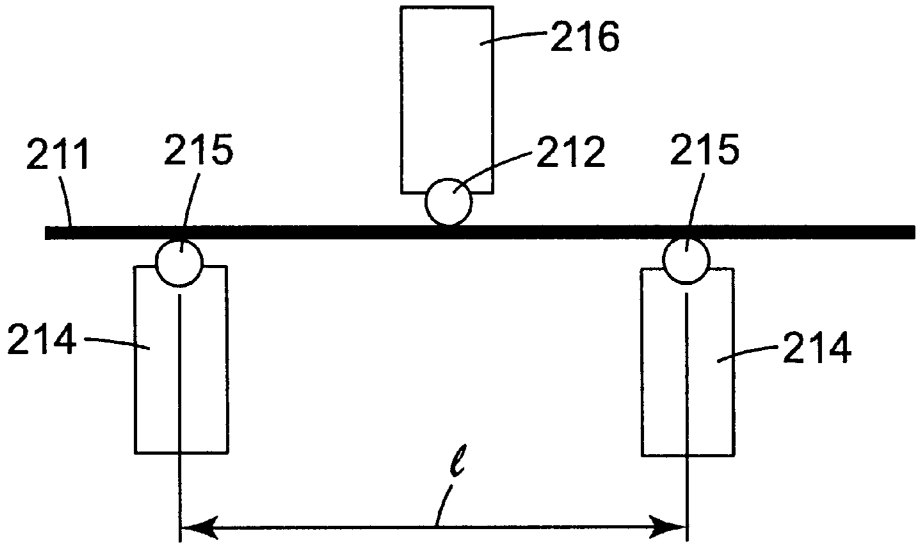
FIG. 6 is a schematic of the Three-Point Bend Strength Test apparatus.

The test specimen was loaded as a simple beam in three-point symmetrical loading. The bend strength was obtained by monotonic loading until the wire broke. The load at failure P was recorded and used to calculate the three-point bend strength according to Equation 1 (with Equation 3). A schematic of the test apparatus for is shown in FIG. 6. The apparatus consisted of two adjustable supports 214, means of applying a load 212, and means of measuring load 216. The supports were hardened steel pins with a radius of 3 mm at the supporting edge. The separation between the supports was adjustable along the specimen longitudinal axis. Sample to be tested is shown as 211.

The test specimens were straight, not wavy or twisted. The span was between 15 to 22 times the wire minimum diameter (d). The total specimen length was at least 50 times the wire minimum diameter (d). The specimen was be placed symmetrically on the supports, and gently taped by hand to minimize friction at the supports.

The Three-Point Bend Strength used for the Wire Proof Test, described below, was the average of Three-Point Bend Strengths from eight samples.

Wire Proof Test

Figure 7:
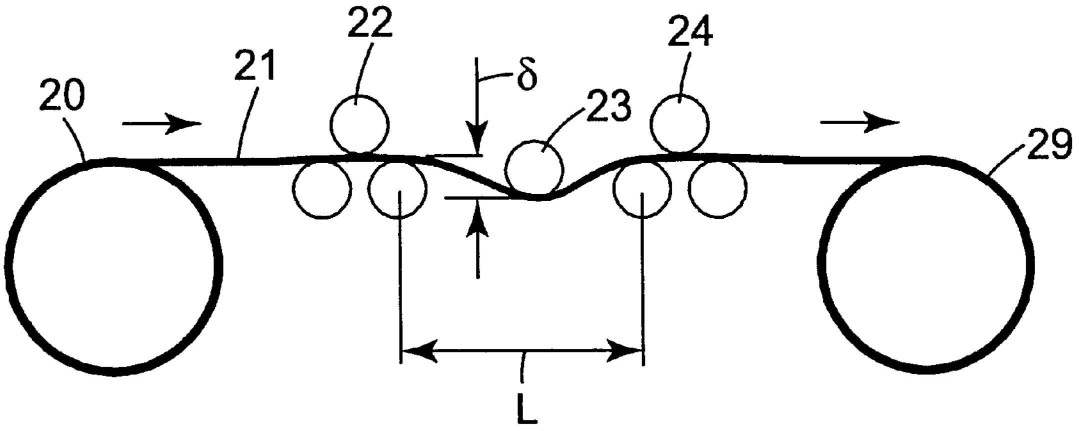
FIG. 7 is a schematic of the Wire Proof Test apparatus.

The wire was continuously proof tested at room temperature (about 20° C.) in a bending mode at a set value of the measured Three-Point Bend Strength using an apparatus, schematic of which is illustrated in FIG. 7. Wire (to be tested) 21 was supplied from spool 20, guided through first and second sets of three rollers 22 and 24 and deflected by 4 cm diameter roller 23 over test span L, and collected on spool 29. Spool 29 was driven to pull the wire from spool 20 through the test apparatus. Roller sets 22 and 24 were 40 mm diameter steel bearings. The outside surfaces of rollers in roller sets 22 and 24 each had a small V-groove centrally located around the diameter of the roller. The V-groove was about 1 mm deep by about 1 mm wide. The wire being tested was aligned in the V-groove to travel perpendicular to the axis of the rollers during the test. The two lower rollers in each of roller sets 22 and 24 were spaced 100 mm apart center to center. The upper roller of each of roller sets 22 and 24 were spaced symmetrically between the two respective lower rollers. The vertical position of the upper roller of each of roller sets 22 and 24 were adjustable. The separation between the outer surfaces of the upper and lower rollers of each of roller sets 22 and 24 was equal to the (average minimum) wire diameter, as calculated for the Three-Point Bend Strength Test, above (i.e., d). The separation was such that the wire 21 was supported but could freely travel between the upper and lower rollers in roller sets 22 and 24 with minimal tension (i.e., less than 1 Newton). Center roller 23 is a 40 mm outside diameter steel bearing located symmetrically between the roller sets 22 and 24. The tension in the wire between spools 20 and 29 was not greater than 100 Newtons for wire having a (average minimum) diameter, as calculated for the Three Point-Bend Strength Test, above (i.e., d), greater or equal to 1.5 mm. The tension in the wire between spools 20 and 29 was not greater than 20 Newton for wire having a (average minimum) diameter, as calculated for the Three-Point Bend Strength Test, above (i.e., d) less than 1.5 mm. The span, L, for the Wire Proof Test was the center to center distance between the inside rollers in the roller sets 22 and 24. Span, L, was set between 120–260 times the (average minimum) wire diameter, as calculated for the Three-Point Bend Strength Test, above (i.e., d). The deflection of the center roller, δ, was the distance between the centerline of a straight wire going through roller sets 22 and 24 and the lower surface of roller 23. Proof testing was carried out with the wire traveling at a speed of 0.1–10 meters/min. The deflection δ of the center roller was set to apply a stress equivalent to 75% of the three-point bend strength of the wire as determined by the Three-Point Bend Strength Test.

The deflection, δ, of central roller 23 forcing the wire being tested to be subjected to a stress equal to 75% of the Three-Point Bend Strength (obtained as described above in the Three-Point Bend Strength Test) was given by Equation 4:

$$\delta = \frac{L^2}{24\,Ey_m}(0.75\sigma_b) \quad (4)$$

where L was the span, E the Young's modulus of the wire, $y_m$ was as defined above in the Three-Point Bend Strength Test, and $\sigma_b$ was the Three-Point Bend Strength (determined as above in the Three-Point Bend Strength Test). For cylindrical or nearly cylindrical wires the axis of the minimum diameter of the wire is oriented vertically in the Wire Proof Test apparatus, the deflection was given by $$\delta = \frac{L^2}{12\,Ed}(0.75\sigma_b) \quad (5)$$

Where d is the (average minimum) wire diameter (determined above in the Three-Point Bend Strength Test) and E is the modulus of the wire. The Young's modulus of the wire, E, was estimated by:

$$E = fE_f \quad (6)$$

where f was the fiber volume fraction (determined as described below) and $E_f$ the Young's modulus of the fiber. The applied deflection intended to cause the wire to break when the local wire strength was less than 75% of the Three-Point Bend Strength.

The fiber volume fraction was measured by a standard metallographic technique. The wire cross-section was polished and the fiber volume fraction measured by using the density profiling functions with the aid of a computer program called NIH IMAGE (version 1.61), a public domain image-processing program developed by the Research Services Branch of the National Institutes of Health (obtained from website http//rsb.info.nih.gov/nih-image). This software measured the mean gray scale intensity of a representative area of the wire.

A piece of the wire was mounted in mounting resin (obtained under the trade designation "EPOXICURE" from Buehler Inc., Lake Bluff, Ill.). The mounted wire was polished using a conventional grinder/polisher and conventional diamond slurries with the final polishing step using a 1 micrometer diamond slurry obtained under the trade designation "DIAMOND SPRAY" from Struers, West Lake, Ohio) to obtain a polished cross-section of the wire. A scanning electron microscope (SEM) photomicrograph was taken of the polished wire cross-section at 150×. When taking the SEM photomicrographs, the threshold level of the image was adjusted to have all fibers at zero intensity, to create a binary image. The SEM photomicrograph was analyzed with the NIH IMAGE software, and the fiber volume fraction obtained by dividing the mean intensity of the binary image by the maximum intensity. The accuracy of this method for determining the fiber volume fraction was believed to be +/−2%.

Example 1

Example 1 aluminum composite wire was prepared as follows. Referring to FIG. 5, sixty-six tows of 1500 denier alumina fibers (available from the 3M Company under the trade designation "NEXTEL 610"; Young's modulus reported in 1996 product brochure was 373 GPa) were collimated into a single bundle. The single bundle was heat cleaned by passing it, at a rate of 1.5 m/min., through a 1 meter tube furnace (obtained from ATS, Tulsa Okla.), in air, at 1000° C. The bundle was then evacuated at 1.0 Torr by passing the bundle through an alumina entrance tube (2.7 mm in diameter, 30 cm in length; matched in diameter to the diameter of the fiber bundle) into a vacuum chamber (6 cm in diameter; 20 cm in length). The vacuum chamber was equipped with a mechanical vacuum pump having a pumping capacity of 0.4 $m^3$/min. After exiting the vacuum chamber, the evacuated fibers entered a molten aluminum bath through a alumina exit tube (2.7 mm internal diameter and 25 cm in length) that was partially immersed (about 5 cm) in the molten aluminum bath. The molten aluminum bath was prepared by melting aluminum (99.94 % pure Al; obtained from NSA ALUMINUM, HAWESVILLE, Ky.) at 726° C. The molten aluminum was maintained at about 726° C., and was continuously degassed by bubbling 800 $cm^3$/min. of argon gas through a silicon carbide porous tube (obtained from Stahl Specialty Co, Kingsville, Mo.) immersed in the aluminum bath. The hydrogen content of the molten aluminum was measured by quenching a sample of the molten aluminum in a copper crucible having a 0.64 cm×12.7 cm×7.6 cm cavity, and analyzing the resulting solidified aluminum ingot for its hydrogen content using a standardized mass spectrometer test analysis (obtained from LECO Corp., St. Joseph, Mich.).

Infiltration of the molten aluminum into the fiber bundle was facilitated through the use of ultrasonic infiltration. Ultrasonic vibration was provided by a wave-guide connected to an ultrasonic transducer (obtained from Sonics & Materials, Danbury Conn.). The wave guide consisted of a 91 wt % Nb-9wt % Mo cylindrical rod, 25 mm in diameter by 90 mm in length attached with a central 10 mm screw, which was screwed to a 482 mm long, 25 mm in diameter titanium waveguide (90 wt. % Ti-6wt. % Al-4 wt. % V). The Nb-9 wt % Mo rod was supplied by PMTI, Inc., Large, Pa. The niobium rod was positioned within 2.5 mm of the centerline of the fiber bundle. The wave-guide was operated at 20 kHz, with a 20 micrometer displacement at the tip. The fiber bundle was pulled through the molten aluminum bath by a caterpuller (obtained from Tulsa Power Products, Tulsa Okla.) operating at a speed of 1.5 meter/minute.

The aluminum infiltrated fiber bundle exited the crucible through a silicon nitride exit die (inside diameter 2.5 mm, outside diameter 19 mm and length 12.7 mm; obtained from Branson and Bratton Inc., Burr Ridge, Ill). After exiting the molten aluminum bath, cooling of the wire was aided with the use of two streams of nitrogen gas. More specifically, two plugged tubes, having 4.8 mm inside diameters, were each perforated on the sides with five holes. The holes were 1.27 mm in diameter, and located 6 mm apart along a 30 mm length. Nitrogen gas flowed through the tubes at a flow rate of 100 liters per minutes, and exited through the small side holes. The first hole on each tube was positioned about 50 mm from the exit die, and about 6 mm away from the wire. The tubes were positioned, one on each side of the wire. The wire was then wound onto a spool. The composition of the Example 1 aluminum matrix, as determined by inductively coupled plasma analysis, was 0.03 wt. % Fe, 0.02 wt. % Nb, 0.03 wt. % Si, 0.01 wt. % Zn, 0.003 wt. % Cu, and the balance Al. While making the wire, the hydrogen content of the aluminum bath was about 0.07 $cm^3$/100 gm aluminum.

Ten spools of aluminum composite wire 2.5 mm in diameter were prepared for Example 1. Each spool contained at least 300 meters of wire; some of the coils as much as 600 meters of wire.

The wire bend strength, as measured according to the "Bend Strength Test" using a 50.8 mm test span, was determined to be 1.79 GPa. The average fiber content of the wire was determined to be 52 volume percent, and the modulus, using Equation 6, to be 194 GPa. The wire was then proof tested according to the "Wire Proof Test" using a 406 mm span and a deflection of 38.1 mm. All ten coils of the wire passed the Wire Proof test without any breaks.

Example 2

Three coils of aluminum composite wires were prepared substantially as described in Example 1, except the composition of the Example 2 aluminum matrix, as determined by inductively coupled plasma analysis, was 0.08 wt. % Si, 0.03 wt. % Fe, 0.02 wt. % Nb, 0.01 wt. % Zn, 0.002 wt. % Cr, 0.003 wt. % Cu, and the balance Al. Each coil was at least 300 meters in length, and passed the "Wire Proof Test" without any breaks.

Comparative Example A

One coil of aluminum matrix composite wire, 100 meters in length, was prepared substantially as described in Example 2 of PCT/US96/07286, PCT Publication WO. 97/00976, the disclosure of which is incorporated herein by reference, except the diameter of the fiber bundle was 2.0 mm, and the fiber content of the wire 45 volume percent.

While making the wire the hydrogen content of the aluminum melt was believed to be about 0.2–0.3 $cm^3$/100 gm aluminum.

The wire bend strength, as measured according to the "Bend Strength Test" using a 50.8 mm test span, was determined to be 2.07 GPa. The modulus of the wire was calculated, using Equation 6, to be 165 GPa. The wire was then proof tested according to the "Wire Proof Test" using a 305mm span and a deflection of 40.6 mm. During this proof testing, the Comparative Example A wire broke after 7 meters, and again after 54 meters. The test was stopped at this point and the fracture surface at a break point examined using scanning electron microscope. "Dry fibers" were observed at the fracture surface.

Example 3

One coil of aluminum composite wire was prepared substantially as described in Example 1 except as follows. Five tows of 2,000 Tex (g/1000 meters) silicon carbide fiber (made by Nippon Carbon Co. and obtained under the trade designation "NICALON CG GRADE" from Dow Corning, Midland, Mich. (now available from COI Ceramics, San Diego, Calif.); fiber modulus reported in the Dow Corning datasheet was 220 GPa) was used in place of the alumina fiber. The heat-cleaned silicon carbide fiber bundle was evacuated at 9 Torr by passing the bundle through an alumina entrance tube (1.2 mm in diameter, 25 cm in length; matched in diameter to the diameter of the fiber bundle) into the vacuum chamber. The 9 Torr pressure was maintained by bleeding argon gas into the vacuum chamber. The horn was positioned within 0.6 mm of the centerline of the bundle. The fiber bundle was pulled through the molten aluminum bath at a speed of 3.6 meter/minute by the caterpuller and the infiltrated fiber bundle exited the crucible through a silicon nitride exit die with an inside diameter of 1 mm.

The resulting 450 meter long wire had a diameter of 1.08 mm. The wire bend strength, as measured according to the "Bend Strength Test" using a 15.8 mm test span, was determined to be 1.8 GPa. The average fiber content of the wire was determined to be 48 volume percent, and the modulus, using Equation 6, to be 106 GPa. The wire was then proof tested according to the "Wire Proof Test" using a 254 mm test span and a deflection of 40.6 mm. The wire passed the Wire Proof Test without any breaks.

Comparative Example B

Comparative Example B was a 300 meter length of aluminum matrix composite wire obtained from Nippon Carbon Co. The wire was reported to have been made using SiC fibers (formerly available from Dow Corning (now available from COI Ceramics) under the trade designation "HI-NICALON". The fiber content of the wire was 52.5 Volume percent. The reported modulus of the SiC ("HI-NICALON") fiber was 270 GPa. The diameter of the wire 0.82 mm The wire bend strength, as measured according to the "Bend Strength Test" using a 15.8 mm test span, was determined to be 2.3 GPa. The modulus of the wire was calculated, using Equation 6, to be 140 GPa. The wire was t hen proof tested using a 254 mm span and a deflection of 81 mm. During this proof testing, the Comparative Example B wire broke after 6 meters, and again after each of 12 meters and 15 meters. The test was stopped at this point and the fracture surface at a break point examined using scanning electron microscope. "Dry fibers" were observed at the fracture surface.

Example 4

One coil of aluminum composite wire was prepared substantially as described in Example 1 except as follows. Four tows of 2000 denier aluminoborosilicate fibers (available from the 3M Company under the trade designation "NEXTEL 440";~70 wt. % $Al_2O_3$, ~28 wt. % $SiO_2$, and ~2 wt. % $B_2O_3$; Young's modulus reported in 1996 (98-0400-5207-2) product brochure was 190 GPa. The fibers were evacuated at 0.7 Torr by passing the fiber bundle through the alumina entrance tube into the vacuum chamber. The horn was positioned within 0.6 mm of the centerline of the bundle of fibers. The fiber bundle was pulled through the molten aluminum bath by the caterpuller at a speed of 4.5 meters/min., and the infiltrated fiber bundle exited the crucible through a silicon nitride exit die with an inside diameter of 1 mm.

The resulting 450 meter long wire had a diameter of 1.0 mm. The wire bend strength, as measured according to the "Bend Strength Test" using, a 15.8 mm test span, was determined to be 0.75 GPa. The average fiber content of the wire was determined to be 40 volume percent, and the modulus, using, Equation 6, to be 76 GPa.

The wire was then proof tested according to the "Wire Proof Test" using a 254 mm span and a deflection of 30 mm. The entire length of the wire passed the Wire Proof test without any breaks.

Example 5

Example 5 demonstrated the effect of processing speed on properties of the composite wire. Aluminum matrix composite wires, 2.5 mm diameter, were prepared substantially as described in Example 1, except the wire processing speed was varied between 1.5 meters/min. and 4 m/min. The length of the wire made at a given speed varied between 20 meters and 300 meters depending on the frequency of breaks detected in the Wire Proof Test. The length was at least 300 meters if the wire did not break; otherwise enough wire was made to collect at least three breaks. This example shows that at low speeds, 1.5 m/min. and 2.3 m/min., the wire did not break in the Wire Proof Test (i.e., there were zero breaks) after running 300 meters of wire. At a speed of about 3.55 m/min., the wire broke on average every 6 meters. At a speed of 4 m/min., the wire broke on average every meter. For samples that did not pass the Wire Proof Test, the test was run until there were at least three breaks. Break fracture surfaces were observed using scanning electron microscopy. Dry fibers (i.e., uninfiltrated fibers) were observed at the fracture surfaces.

Example 6

Example 6 demonstrated the effect of wire diameter and processing speed on properties of the composite wire. Aluminum matrix composite wires were prepared substantially as described in Example 1, except that the diameter of the wire was varied between 1 millimeter (mm) and 2.5 mm, and the wire speed was also varied for each wire diameter.

For a 1 mm diameter wire, processed at 6.1 m/min. the wire passed the Wire Proof Test with zero breaks along a 300 meter length. The wire broke due to dry fibers when the speed was greater or equal to about 10 m/min.

For a 2.5 mm diameter wire, the wire passed the Wire Proof Test with zero breaks along a 300 meters length at a processing speed of 2.3 m/min. The wire broke due to dry fibers when the speed was greater or equal to about 4 m/min.

Example 7

Example 7 demonstrated the effect of vacuum, processing speed, and wire diameter on processing speed. Aluminum matrix composite wires were prepared substantially as described in Example 1, except the vacuum was varied between about 1 Torr and 760 Torr (atmospheric pressure).

A 2.5 mm diameter wire passed the Wire Proof Test with zero breaks along a 300 meter length when made at a processing speed of 2.3 m/m under a vacuum of 1 Torr. The 2.5 mm diameter wire consistently broke in the Wire Proof Test when made at a processing speed of 2.3 m/min. under atmospheric pressure (i.e., 760 Torr). The fiber bundle was not full y infiltrated with aluminum. The speed was reduced to less than 0.1 m/min. and the wire was still not infiltrated. For this diameter, the vacuum enabled the infiltration of the 2.5 mm diameter wire.

A 1 mm diameter wire passed the Wire Proof Test with zero breaks along a 300 meter length when made at a processing speed of 6.1 m/min. with a vacuum of 1 Torr. The 1 mm diameter wire passed the Wire Proof Test with zero breaks along a 300 meter length at a processing speed of 3 m/min. with no vacuum (i.e., 760 Torr). The 1 mm diameter wire consistently broke in the Wire Proof Test when made at a processing speed of 6.1 m/min. with no vacuum (i.e., 760 Torr).

Example 8

Example 8 demonstrated the effect of surface contamination on properties of the composite wire. Wire was prepared substantially according to Example 1. The fiber was heat-cleaned at a rate of 1.5 m/min. through a 3 cm diameter, 0.3 meter long tube furnace set at 1000° C. Multiple 300 meter long wire coils passed the Wire Proof Test with zero breaks.

The surface chemistry of the ceramic fiber ("NEXTEL 610") was evaluated, before and after heat-cleaning. The fiber was cleaned by heating it at 1000° C. for 12 seconds. The fiber was analyzed using Electron Spectroscopy for Chemical Analysis (ESCA) (also known as X-ray Photoelectron Spectroscopy (XPS)). The ESCA equipment used was obtained under the trade designation "HP5950A" from Hewlett-Packard of Palo Alto, Calif. The ESCA equipment included a hemispherical electron energy analyzer, and operated in a constant pass energy mode. The X-ray source was aluminum K-alpha. The probe angle was a 38 degree photoelectron take-off angle as measured with respect to the analyzer correction lens axis. Quantitative data was calculated using software and sensitivity factors provided by the instrument manufacturer. The carbon spectrum after heating indicated less than 22% area fraction carbon on the fiber.

Wire was prepared substantially according to Example 1 except that local carbon contamination was purposefully introduced after the tube furnace by spraying cleaner available under the trade name "CITRUS CLEANER" from the 3M Company over a 2-cm section of fiber. The wire broke in the Wire Proof Test exactly where the surface contamination was introduced.

Wire was also prepared using fiber contaminated with fingerprints. The carbon spectrum in such contaminated samples was measured to be more than 34% per area fraction. Such carbon contamination is believed to increase the contact angle and cause losses of infiltration.

Example 9

This example demonstrated the effect of hydrogen in the melt. Wire was prepared substantially as described in Example 1 except that the melt was not degassed with argon for at least 24 hours prior to making wire. The wire diameter was 2.5 mm and the processing speed was 2.3 m/min. The wire broke at least three times in the Wire Proof Test over a 300-meter length. The fracture surface was analyzed and, although not wanting to be bound by theory, it is believed that the cause of the break was due to large voids resulting from hydrogen gas. The voids were about 0.5 mm in diameter and 2–3 mm in length or more. Without the melt degassing, treatment described in Example 1, the typical hydrogen concentration was approximately 0.3 cm $^3$/100 grams of aluminum.

A wire was also prepared substantially as described in Example 1 except that the melt was degassed with argon for 2 hours before making wire. The wire diameter was 2.5 mm and the processing speed was 2.3 meters/min. The wire passed the Wire Proof Test without a break. The typical hydrogen concentration with the melt after the degassing treatment was approximately 0.07–0.1 cm$^3$/100 grams of aluminum.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A metal matrix composite wire comprising at least one tow comprising a plurality of substantially continuous, longitudinally positioned fibers in a metal matrix, wherein the fibers are selected from the group consisting of ceramic fibers, carbon fibers, and mixtures thereof, wherein the metal matrix has a melting point of not greater than 1100° C., and wherein the wire has a length of at least 300 meters and, for 300 meters of the wire, a bend failure value of zero.

2. The composite wire of claim 1 comprising a plurality of tows comprising the fibers.

3. The composite wire of claim 2 wherein the metal matrix has a melting point of not greater than 1000° C.

4. The composite wire of claim 2 wherein the metal matrix has a melting point of not greater than 700° C.

5. The composite wire of claim 2 wherein the metal matrix comprises aluminum, zinc, tin, or alloys thereof.

6. The composite wire of claim 2 wherein the metal matrix comprises aluminum or alloys thereof.

7. The composite wire of claim 2 wherein the metal matrix comprises at least 98 percent by weight aluminum, based on the total weight of the matrix.

8. The composite wire of claim 2 wherein at least about 85% by number of the fibers are substantially continuous.

9. The composite wire of claim 2 comprising at least about 15 volume percent of the fibers and no greater than about 70 volume percent fiber based on the total volume of the wire.

10. The composite wire of claim 2 wherein the fibers are ceramic fibers.

11. The composite wire of claim 2 wherein the fibers are ceramic oxide fibers.

12. The composite wire of claim 2 wherein the fibers are polycrystalline, alpha alumina-based fibers.

13. The composite wire of claim 2 wherein the polycrystalline, alpha alumina-based fibers comprise at least 99% by weight $Al_2O_3$, based on the total metal oxide content of the respective fiber.

14. The composite wire of claim 2 having a length of at least 600 meters, and, over a length of 600 meters, a bend failure value of zero.

15. The composite wire of claim 2 having a length of at least 900 meters, and, over a length of 900 meters, a bend failure value of zero.

16. A cable comprising at least one metal matrix composite wire comprising at least one tow comprising a plurality of substantially continuous, longitudinally positioned fibers in a metal matrix, wherein the fibers are selected from the group consisting of ceramic fibers, carbon fibers, and mixtures thereof, wherein the metal matrix has a melting point of not greater than 1100° C., and wherein the wire has a length of at least 300 meters and, for 300 meters of the wire, a bend failure value of zero.

17. The cable of claim 16 comprising a plurality of tows comprising the fibers.

18. The cable of claim 17 wherein the metal matrix has a melting point of not greater than 1000° C.

19. The cable of claim 17 wherein the metal matrix has a melting point of not greater than 700° C.

20. The cable of claim 17 wherein the metal matrix comprises aluminum, zinc, tin, or alloys thereof.

21. The cable of claim 17 wherein the metal matrix comprises aluminum or alloys thereof.

22. The cable of claim 17 wherein the fibers are ceramic fibers.

23. The cable of claim 17 wherein the fibers are ceramic oxide fibers.

24. The cable of claim 17 wherein the fibers are polycrystalline, alpha alumina-based fibers.

25. The cable of claim 17 wherein the wires are helically stranded.

26. The cable of claim 25 further comprising a plurality of secondary wires.

27. The cable of claim 17 comprising a core and a shell wherein the core comprises the composite wires and the shell comprises the secondary wires.

28. A method for making a metal matrix composite wire comprising a plurality of substantially continuous, longitudinally positioned fibers in a metal matrix, the method comprising:

providing a contained volume of molten metal matrix material, wherein the metal matrix material has a melting point of not greater than 1100° C.;

immersing at least one tow comprising a plurality of substantially continuous fibers into the contained volume of melted matrix material, wherein the fibers are selected from the group consisting of ceramic fibers, carbon fibers, and mixtures thereof;

imparting ultrasonic energy to cause vibration of at least a portion of the contained volume of molten metal matrix material to permit at least a portion of the molten metal matrix material to infiltrate into the plurality of fibers such that an infiltrated plurality of fibers is provided; and withdrawing the infiltrated plurality of fibers from the contained volume of molten metal matrix material under conditions which permit the molten metal matrix material to solidify to provide a metal matrix composite wire comprising at least one tow comprising a plurality of the fibers, wherein the fibers are substantially continuous, longitudinally positioned in a metal matrix, wherein the metal matrix has a melting point of not greater than 1000° C., and wherein the wire has a length of at least 300 meters and, for 300 meters of the wire, a bend failure value of zero.

29. The method of claim 28 comprising a plurality of tows comprising the fibers.

30. The method of claim 29 wherein the metal matrix has a melting point of not greater than 1000° C.

31. The method of claim 29 wherein the metal matrix has a melting point of not greater than 700° C.

* * * * *

UNITED STATES PATENT AND TRADEMARK OFFICE

CERTIFICATE OF CORRECTION

PATENT NO. : 6,329,056 B1
DATED : December 11, 2001
INVENTOR(S) : Deve, Herve E.

It is certified that error appears in the above-identified patent and that said Letters Patent is hereby corrected as shown below:

Title page,
Item [56], OTHER PUBLICATIONS, "Y. Yasutomi, et al." reference, delete "beharior" and insert in place thereof -- behavior --.

Column 1,
Line 44, delete "the" following "strength" and insert -- the -- preceding "strength".

Column 3,
Line 51, delete "(sce," and insert in place thereof -- (see, --.
Line 52, delete "c.g.," and insert in place thereof -- e.g., --.
Line 67, delete "(C.g.," and insert in place thereof -- (e.g., --.

Column 11,
Line 50, delete "be" following "was".

Column 15,
Line 53, insert -- . -- following "mm".
Line 57, delete "t hen" and insert in place thereof -- then --.

Column 17,
Line 6, delete "m/m" and insert in place thereof -- m/min. --.
Line 10, delete "full y" and insert in place thereof -- fully --.

Signed and Sealed this

Tenth Day of June, 2003

JAMES E. ROGAN
*Director of the United States Patent and Trademark Office*